(12) United States Patent
Kreitler

(10) Patent No.: US 7,137,668 B2
(45) Date of Patent: Nov. 21, 2006

(54) MULTI-POSITION HEAD RESTRAINT

(75) Inventor: Thomas Edward Kreitler, Farmington Hills, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/828,758

(22) Filed: Apr. 21, 2004

(65) Prior Publication Data
US 2004/0217640 A1 Nov. 4, 2004

Related U.S. Application Data

(60) Provisional application No. 60/466,257, filed on Apr. 29, 2003.

(51) Int. Cl.
A47C 7/36 (2006.01)
(52) U.S. Cl. ................................ 297/410; 297/404
(58) Field of Classification Search ................ 297/410, 297/404
See application file for complete search history.

(56) References Cited

U.S. PATENT DOCUMENTS

| 2,976,915 | A | * | 3/1961 | Spound ................ 297/61 |
| 3,186,763 | A | * | 6/1965 | Ferrara ................ 297/410 |
| 3,512,833 | A | | 5/1970 | Sugiura |
| 3,544,162 | A | | 12/1970 | Uchiyamada et al. |
| 3,563,602 | A | | 2/1971 | Ohta |
| 3,572,834 | A | | 3/1971 | Herzer |
| 4,113,310 | A | | 9/1978 | Kapanka |
| 4,256,341 | A | | 3/1981 | Goldner et al. |
| 4,265,482 | A | | 5/1981 | Nishimura et al. |
| 4,312,538 | A | | 1/1982 | Kennedy et al. |
| 4,351,563 | A | | 9/1982 | Hattori |
| 4,478,456 | A | | 10/1984 | Mitsui |
| 4,483,565 | A | * | 11/1984 | Terui et al. ................ 297/410 |
| 4,540,217 | A | | 9/1985 | Suzuki |
| 4,545,618 | A | | 10/1985 | Kitamura |
| 4,568,123 | A | | 2/1986 | Yasui et al. |
| 4,606,578 | A | | 8/1986 | Yasui |
| 4,657,425 | A | | 4/1987 | Takahashi |
| 4,671,573 | A | | 6/1987 | Nemoto et al. |
| 4,678,232 | A | | 7/1987 | Ishida et al. |
| 4,679,850 | A | | 7/1987 | Bianchi et al. |
| 4,685,737 | A | | 8/1987 | Deley et al. |
| 4,798,415 | A | | 1/1989 | Tanino et al. |
| 4,854,642 | A | | 8/1989 | Vidwans et al. |
| 4,856,848 | A | | 8/1989 | O'Sullivan et al. |
| 5,056,867 | A | | 10/1991 | Foster et al. |
| 5,110,185 | A | * | 5/1992 | Schmutz et al. ............ 297/410 |

(Continued)

FOREIGN PATENT DOCUMENTS

EP 0352234 A1 1/1990

(Continued)

Primary Examiner—Peter M. Cuomo
Assistant Examiner—Joseph Edell
(74) Attorney, Agent, or Firm—Clark Hill PLC

(57) ABSTRACT

An automotive seat includes a seat cushion, a seat back, and a multi-position head restraint mounted to the seat back that is moveable between a deployed position and a retracted position. The seat assembly is characterized by a control mechanism mounted within the head restraint that allows the head restraint to be easily movable between the deployed and retracted positions. The control mechanism allows the passenger to place the head restraint in the retracted position by pushing down on the head restraint when the head restraint is in the deployed position. The passenger simply uses an actuation lever of the control mechanism to place the head restraint in the deployed position when the head restraint is in the retracted position.

1 Claim, 2 Drawing Sheets

U.S. PATENT DOCUMENTS

| | | |
|---|---|---|
| 5,177,823 A | 1/1993 | Riach |
| 5,199,765 A * | 4/1993 | Garmendia et al. ......... 297/391 |
| 5,711,579 A * | 1/1998 | Albrecht ..................... 297/410 |
| 5,816,658 A | 10/1998 | Wallis |
| 5,895,094 A | 4/1999 | Mori et al. |
| 5,934,755 A | 8/1999 | Halamish |
| 5,964,505 A | 10/1999 | Koenig et al. |
| 6,062,645 A | 5/2000 | Russell |
| 6,068,337 A | 5/2000 | De Filippo |
| 6,074,010 A | 6/2000 | Takeda |
| 6,431,648 B1 | 8/2002 | Cosentino et al. |

FOREIGN PATENT DOCUMENTS

| | | |
|---|---|---|
| WO | WO 00/60981 A1 | 10/2000 |
| WO | WO02/060723 A2 | 8/2002 |

\* cited by examiner

MULTI-POSITION HEAD RESTRAINT

This application claims the benefit of U.S. Provisional Application No. 60/466,257, filed Apr. 29, 2003, the entire contents of which is incorporated herein by reference.

TECHNICAL FIELD

The present invention relates generally to an automotive seat assembly, and in particular to a seat assembly that includes and adjustable or retractable head restraint.

BACKGROUND OF THE INVENTION

Front and rear seats in many passenger vehicles, such as automobiles, include respective head restraints which provide added comfort for a passenger. In addition to the comfort feature, the head restraints also provide a safety feature. Namely, the head restraints provide needed head support during rear end collisions which reduces the likelihood of whiplash type injuries. Head restraints are typically mounted to a top portion of a seat back as either an integral part of the seat back or as a separate unit mounted to the seat back. The head restraint usually includes some type of height adjustment mechanism to adjust the height of the heat restraint with respect to the seat back. One such type of adjustment mechanism is an adjustment button that is depressed while the passenger pushes downward on the head restraint bun to adjust the height of the heat restraint.

One of the problems associated with this type of adjustment mechanism is the awkward position of the passenger when depressing the button to adjust the height of the head restraint. In addition, the finger or hand of the passenger may be pinched by the head restraint bun when adjusting the height of the head restraint.

One solution to overrcome these deficiencies is to provide a head restraint design in which the height of the head restraint can be adjusted by use of a motor. However, this solution significantly increases the costs associated with the head restraint design.

Thus, there is a need for a cost-effective head restraint design that allows the passenger to adjust the height of the head restraint without being placed in an awkward position or being exposed to potential injury.

SUMMARY OF THE INVENTION

The inventors of the present invention have recognized these and other problems associated with conventional head restraint designs. To this end, the inventors have developed an automotive seat assembly comprises a seat cushion, a seat back having top and bottom portions, a seat frame for supporting the seat cushion and the seat back, a head restraint mounted to the seat frame by posts and capable of being moved between a deployed position and a retracted position, and a control mechanism disposed within the head restraint for moving the head restraint between the deployed position and the retracted position. This design provides for a seat assembly that can be easily deployed and retracted by the passenger.

In another aspect of the invention, a control mechanism for an automotive seat assembly comprises a housing, a biasing device disposed between posts for continuously biasing a head restraint mounted to a seat frame by the posts, the head restraint capable of being moved between a deployed position and a retracted position, and an actuation device pivotally mounted to the housing. The actuation device includes an actuation lever pivotally mounted to the housing for moving the head restraint to and from the retracted and deployed positions. The actuation device includes a shaft having a flat for engaging notches in the posts. The actuation device allows said head restraint to move to and from the retracted and deployed positions when the flat is substantially parallel to a vertical axis of the posts. The actuation device prevents movement of said head restraint when the flat engages one of the notches in the posts.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
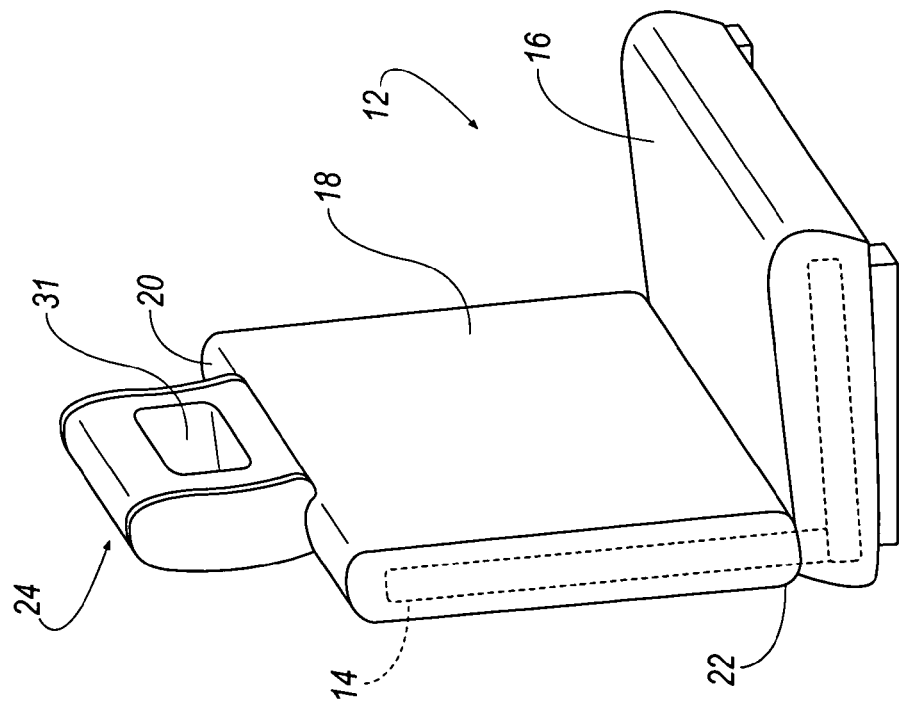
FIG. 1 is a perspective view of a seat assembly incorporating a head restraint in accordance with the invention.

Referring to the Figures, wherein like numerals indicate like or corresponding parts throughout the several views, an automotive seat assembly is generally shown at 10 in FIG. 1. The seat assembly 10 includes a seat 12, a seat cushion 16 and a seat back 18. The seat 12 is of a conventionally known construction which includes a seat frame 14, a flexible foam pad and a trim cover material. As is conventional in the art, the seat back 18 has top 20 and bottom 22 portions and is pivotally mounted to the seat cushion 16 for movement between a seating position and a folded position. As appreciated by those skilled in the art, the seat back 18 is in a seating position when the seat back 18 is upright and substantially perpendicular to the seat cushion 16. The seat back 18 is in the folded position when the seat back 18 is pivoted forward toward the seat cushion 16 to at least partially overlay the seat cushion 16. In some applications the seat cushion 16 may pivot upwardly and forwardly along with the seat back 18 to create what is known in the art as a tumbled seat. In other applications, the seat cushion 16 may pivot upwardly and forwardly independently of the seat back 18 such that the seat back 18 may fold downward abutting an underside of the seat cushion 16.

Figure 3:
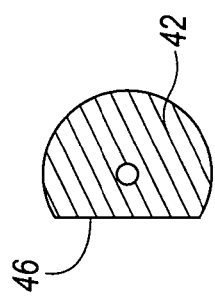
FIG. 3 is a cross-sectional view of the shaft of the control mechanism taken along line 3—3 of FIG. 2 in accordance with the invention.
Figure 4:
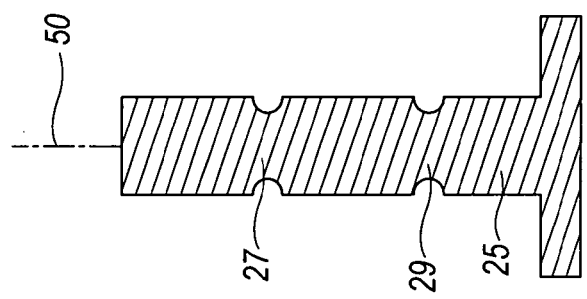
FIG. 4 is a cross-sectional view of the post of the seat assembly taken along line 4—4 of FIG. 2 in accordance with the invention.
Figure 2:
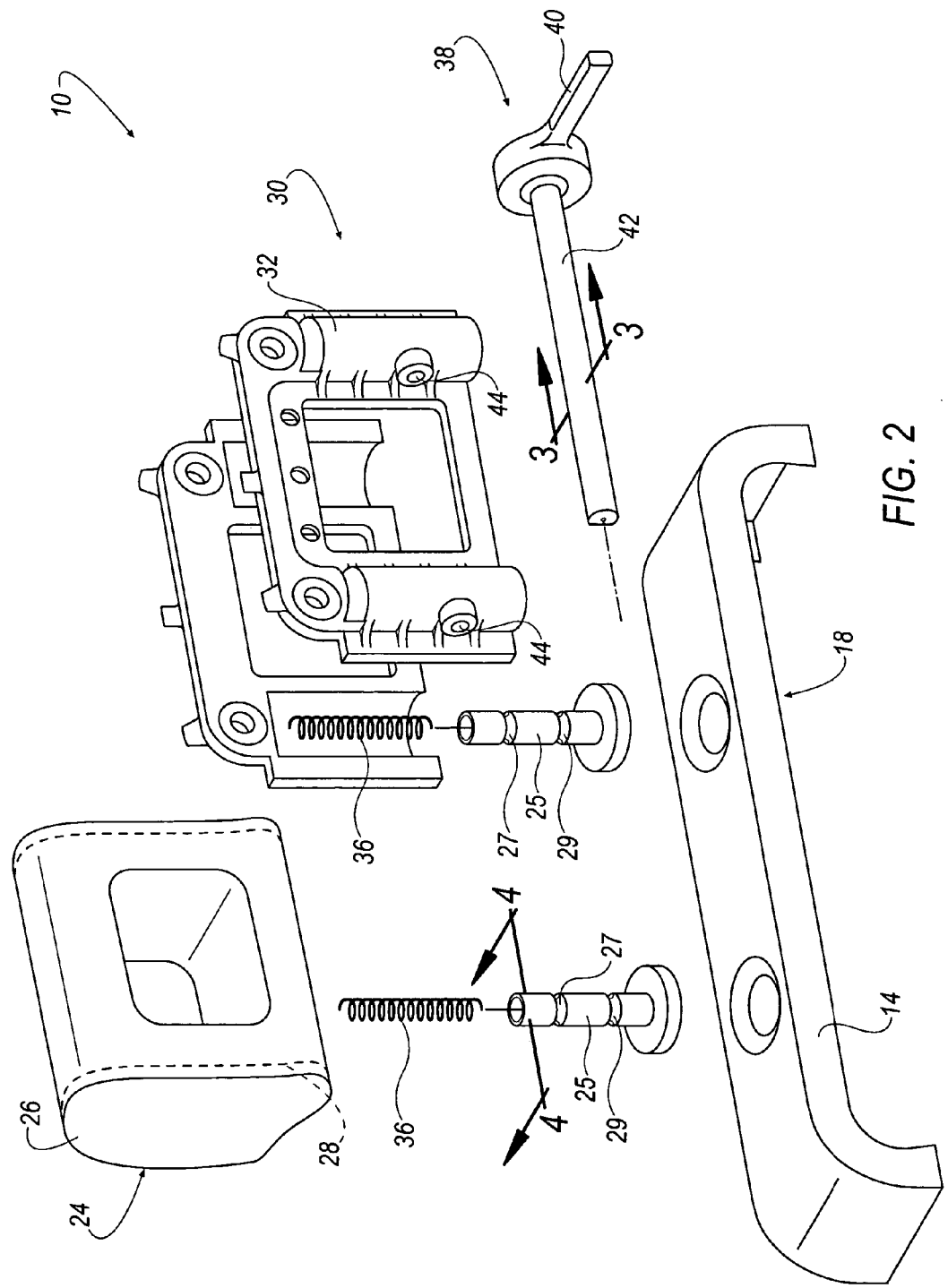
FIG. 2 is an exploded view of the head restraint in accordance with the invention.

Referring now to FIGS. 2–4, the seat assembly 10 also includes a head restraint 24 mounted to the seat frame 14 at the top portion 20 of the seat back 18. Specifically, the head restraint 24 includes a pair of head restraint posts 25 that are mounted to the seat frame 14 by use of a well-known method, such as swedging, or the like. As best shown in FIG. 4, each post 25 includes a plurality of notches 27, 29 the purpose of which is described below. Each post 25 is generally circular in cross-section and may be formed from a roll-formed tube stock material. As appreciated, the head restraint 24 may be of any suitable design or configuration. The head restraint 24 is moveable between at least two positions, for example, a deployed position and a retracted position. The passenger may be able to retract the head restraint 24 in any suitable manner irrespective of the position of the seat back 18. The head restraint 24 includes a bun 26 that is generally of a hollow construction with a cavity 28 therein. Alternatively, the head restraint 24 may include a passageway 31 (shown in FIG. 1). The head restraint 24 may be covered with a foam pad and a trim cover material, such as vinyl, cloth, leather, or the like, similar to the trim cover material for the seat 12.

In accordance with the invention, a control mechanism, generally shown at 30, is mounted within the cavity of the head restraint 24 for moving the head restraint 24 between the deployed and retracted positions. The control mechanism 30 includes a housing 32 fixedly secured to the head restraint 24. In the illustrated embodiment, the housing 32 is formed of two substantially symmetrical halves and is made of a lightweight, relatively sturdy material, such as plastic, or the like. The control mechanism 26 also includes a biasing device 36 disposed within each post 25 for continuously biasing the head restraint 24 between the retracted and deployed positions. In the illustrated embodiment, the biasing device 36 comprises a coil spring 36 that continuously biases the head restraint 24 toward the deployed position. However, the biasing device 36 may continuously bias the head restraint 24 toward the retracted or deployed positions depending upon the particular configuration of the control mechanism 26.

Figure 5:
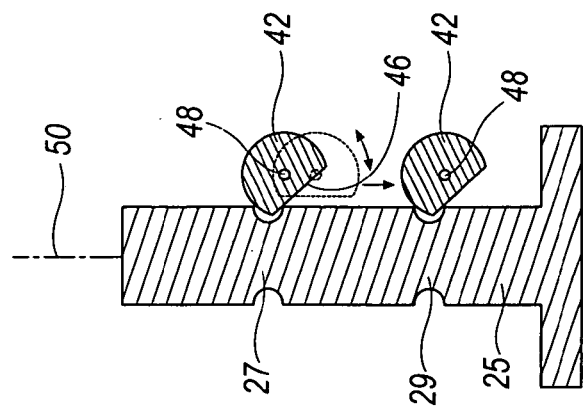
FIG. 5 is a cross-sectional view of the shaft of the control mechanism and the post of the seat assembly when the post is in an engaged and disengaged position.

The control mechanism 26 also includes an actuation device, generally shown at 38, for selectively moving the head restraint 24 between the retracted and deployed positions. The actuation device 38 includes an actuation lever 40 and a shaft 42 affixed to the actuation lever 40. The shaft 42 is pivotally mounted through apertures 44 within the housing 32. The shaft 42 is generally circular in cross-section, except for a flat 46 for engaging the notches 27 on the post 25. The shaft 42 is biased by a biasing member (not shown) of a type well-known in the art that can be disposed within the actuation device 38 for providing a biasing force to rotate the shaft 42 in a counter-clockwise direction about an axis of rotation 48, as shown in FIGS. 1 and 5. It will be appreciated that the invention can be practiced with rotating the actuation device 38 in either a clockwise direction, a counter-clockwise direction, or both. It will also be appreciated that the actuation device 38 may be manually operated by the passenger, or may be actuated by a power operated device (not shown).

In operation, the head restraint is retracted into a down position from the deployed or up position by the passenger pushing downward on the bun 26 of the head restraint. Due to the downward force exerted by the passenger, the flat 46 of the shaft 42 disengages from the notch 27 and is substantially parallel to a vertical axis 50 of the post 25 (as shown in phantom in FIG. 5) and the control mechanism 30 moves downward along the post 25. In addition, the biasing member (not shown) located within the actuation device 38 compresses due to the downward force exerted by the passenger. As the control mechanism 30 moves downward, the shaft 42 rotates in a counter-clockwise direction due to the biasing force of the biasing member (not shown) until the flat 46 engages the notch 29, as shown in phantom in FIG. 5. In addition, the movement of the housing 32 downward causes the coil springs 36 to compress; thereby increasing the upward biasing force of the coil springs 36. Once the flat 46 engages the notch 29, the head restraint 24 is in the retracted position.

To move the head restraint 24 from the retracted or down position to the deployed or up position, the passenger rotates the actuation lever 40 to cause the flat 46 of the shaft 42 to no longer be engaged with the notch 29 and is substantially parallel to a vertical axis 50 of the post 25. As a result, the head restraint 24 moves upwardly due to the biasing force of the coil springs 36. As the head restraint 24 moves upwardly, the shaft 42 rotates in a counter-clockwise direction due to the biasing force of the biasing member (not shown) within the actuation device 38 until the flat 46 engages the notch 27. In addition, the movement of the housing 32 upward causes the coil springs 36 to decompress; thereby decreasing the upward biasing force of the coil springs 36. Once the flat 46 engages the notch 27, the head restraint 24 is in the deployed position.

As described above, the head restraint of the invention can be easily positioned in the deployed or retracted position by the passenger by simply pushing down on the head restraint to place the head restraint from the deployed position into the retracted position, and by rotating the actuation lever to place the head restraint from the retracted position to the deployed position. As appreciated, the head restraint of the invention provides a cost-effective head restraint design that allows the passenger to adjust the height of the head restraint without being placed in an awkward position or being exposed to potential injury, unlike conventional head restraint designs.

It should be understood that the aforementioned and other various alternatives to the embodiments of the invention described herein may be employed in practicing the invention. For example, the principles of the invention can be practiced with other types of conduits that contain a fluid, such as a power steering hose, a clutch hose, or the like. It is intended that the following claims define the scope of the invention and that the method and apparatus within the scope of these claims and their equivalents be covered thereby.

What is claimed is:

1. An automotive seat assembly comprising;
   a seat cushion,
   a seat back having top and bottom portions,
   a seat frame for supporting said seat cushion and said seat back,
   a head restraint mounted to said seat frame by posts and capable of being moved between a deployed position and a retracted position, each of said posts has a plurality of notches, said head restraint comprising:
   a control mechanism disposed within said head restraint for moving the head restraint between the deployed position and the retracted position, said control mechanism comprising a housing, a shaft pivotally mounted on said housing and biased to engage said posts, said shaft having a generally circular cross section with a flat surface and positioned to engage said notches of each of said posts preventing movement of said head restraint and said shaft becomes spaced from said posts upon rotation thereof to disengage said notches enabling movement of said head restraint, and
   a biasing device disposed between said posts and said housing for continuously biasing said head restraint towards the deployed position.

* * * * *